(12) United States Patent
Dhein

(10) Patent No.: US 9,977,959 B2
(45) Date of Patent: *May 22, 2018

(54) SYSTEMS, METHODS, AND COMPUTER-READABLE MEDIA FOR DETERMINING A SALIENT REGION OF GEOGRAPHIC MAP

(71) Applicant: GOOGLE LLC, Mountain View, CA (US)

(72) Inventor: Brendan Edward Dhein, Seattle, WA (US)

(73) Assignee: GOOGLE LLC, Mountain View, CA (US)

( * ) Notice: Subject to any disclaimer, the term of this patent is extended or adjusted under 35 U.S.C. 154(b) by 206 days.

This patent is subject to a terminal disclaimer.

(21) Appl. No.: 14/877,535

(22) Filed: Oct. 7, 2015

(65) Prior Publication Data

US 2016/0026860 A1    Jan. 28, 2016

Related U.S. Application Data

(63) Continuation of application No. 13/828,797, filed on Mar. 14, 2013, now Pat. No. 9,183,438.

(51) Int. Cl.
*G06K 9/00* (2006.01)
*G06K 9/46* (2006.01)
*G06T 11/60* (2006.01)
*G06F 17/30* (2006.01)

(52) U.S. Cl.
CPC ... *G06K 9/00476* (2013.01); *G06F 17/30241* (2013.01); *G06K 9/4671* (2013.01); *G06T 11/60* (2013.01)

(58) Field of Classification Search
None
See application file for complete search history.

(56) References Cited

U.S. PATENT DOCUMENTS

| 7,576,754 | B1 * | 8/2009 | Joseph | G01C 21/32 345/619 |
|---|---|---|---|---|
| 8,369,652 | B1 | 2/2013 | Khosla et al. | |
| 9,183,438 | B1 * | 11/2015 | Dhein | G06F 17/30241 |
| 2008/0154888 | A1 | 6/2008 | Buron et al. | |
| 2013/0148910 | A1 | 6/2013 | Fredembach | |

OTHER PUBLICATIONS

Backstrom, Lars et al., "Spatial Variation in Search Engine Queries," 2008, pp. 1-10, World Wide Web Conference Committee, Beijing, China.

* cited by examiner

*Primary Examiner* — Nirav G Patel
(74) *Attorney, Agent, or Firm* — Marshall, Gerstein & Borun LLP

(57) ABSTRACT

Provided are systems, methods, and computer-readable media for determining a salient region of a geographic map. Geographic areas corresponding to viewports are determined using map coordinates corresponding to perimeters of those viewports. Grid points, and the geographic areas, are overlaid on a portion of the geographic map. Each point is assigned a score based at least on the number of geographic areas overlaying that point. A polygon defined by a subset of the grid points is determined based on the scores, and the polygon is identified as defining a salient region of the geographic map.

17 Claims, 7 Drawing Sheets

SYSTEMS, METHODS, AND COMPUTER-READABLE MEDIA FOR DETERMINING A SALIENT REGION OF GEOGRAPHIC MAP

CROSS-REFERENCE TO RELATED APPLICATIONS

This application is a continuation of U.S. patent application Ser. No. 13/828,797, filed Mar. 14, 2013, the disclosure of which is hereby expressly incorporated herein by reference.

BACKGROUND OF THE INVENTION

1. Field of the Invention

This invention relates generally to geographic maps and, more particularly, to determining regions of interest of a geographic map.

2. Description of the Related Art

Interactive geographic maps are useful for a variety of purposes. For example, users may view interactive maps to learn about a geographic area, to identify the location of geographically-distributed objects (e.g., man-made structures or natural features) in a geographic area, search for categories of objects in a geographic area (e.g., restaurants in a given city), or identify routes between locations in a geographic area (e.g., driving directions from a current location to a desired destination). The map data provided by a geographic map may be subject to testing and verification to ensure that users are presented with the most accurate maps data when interactive with a geographic map. However, as the size of the map data increases, it may be challenging to determine what portions of the geographic map and the map data are desirable for testing and verification.

SUMMARY OF THE INVENTION

Various embodiments of system, methods, and computer-readable media for determining a salient region of a geographic map are provided. In some embodiments, a computer-implemented method for determining a salient region of a geographic map includes obtaining, by one or more processors, a plurality of viewports associated with a geographic map. The plurality of viewports are viewports that have been previously used by a plurality of users to view at least some of a portion of the geographic map. The method also includes determining, by one or more processors and using map coordinates corresponding to perimeters of the plurality of viewports, a plurality of geographic areas corresponding to the plurality of viewports, overlaying, by one or more processors, a plurality of grid points arranged in a fixed grid on the portion of the geographic map, overlaying, by one or more processors, the plurality of geographic areas corresponding to the plurality of viewports on the portion of the geographic map, determining, by one or more processors and for each of the plurality of grid points, a score based at least in part on how many of the plurality of geographic areas overlay the grid point, determining, by one or more processors and based on the determined scores for the plurality of grid points, a polygon defined by a subset of the plurality of grid points, and identifying, by one or more processors, the polygon as defining a salient region of the geographic map.

In other embodiments, a system for determining a salient region of a geographic map includes one or more processors and a non-transitory memory. The memory stores computer code comprising a set of instructions that, when executed by the one or more processors, causes the one or more processors to obtain a plurality of viewports associated with a geographic map. The plurality of viewports are viewports that have been previously used by a plurality of users to view at least some of a portion of the geographic map. The set of instructions also causes the one or more processors to determine, using map coordinates corresponding to perimeters of the plurality of viewports, a plurality of geographic areas corresponding to the plurality of viewports, overlay a plurality of grid points arranged in a fixed grid on the portion of the geographic map, overlay the plurality of geographic areas corresponding to the plurality of viewports on the portion of the geographic map, determine, for each of the plurality of grid points, a score based at least in part on how many of the plurality of geographic areas overlay the grid point, determine, based on the determined scores for the plurality of grid points, a polygon defined by a subset of the plurality of grid points, and identify the polygon as defining a salient region of the geographic map.

In still other embodiments, a non-transitory computer-readable storage medium stores computer code. The computer code comprises a set of instructions that, when executed by one or more processors, causes the one or more processors to obtain a plurality of viewports associated with a geographic map. The plurality of viewports are viewports that have been previously used by a plurality of users to view at least some of a portion of the geographic map. The set of instructions also causes the one or more processors to determine, using map coordinates corresponding to perimeters of the plurality of viewports, a plurality of geographic areas corresponding to the plurality of viewports, overlay a plurality of grid points arranged in a fixed grid on the portion of the geographic map, overlay the plurality of geographic areas corresponding to the plurality of viewports on the portion of the geographic map, determine, for each of the plurality of grid points, a score based at least in part on how many of the plurality of geographic areas overlay the grid point, determine, based on the determined scores for the plurality of grid points, a polygon defined by a subset of the plurality of grid points, and identify the polygon as defining a salient region of the geographic map.

Figure 1:
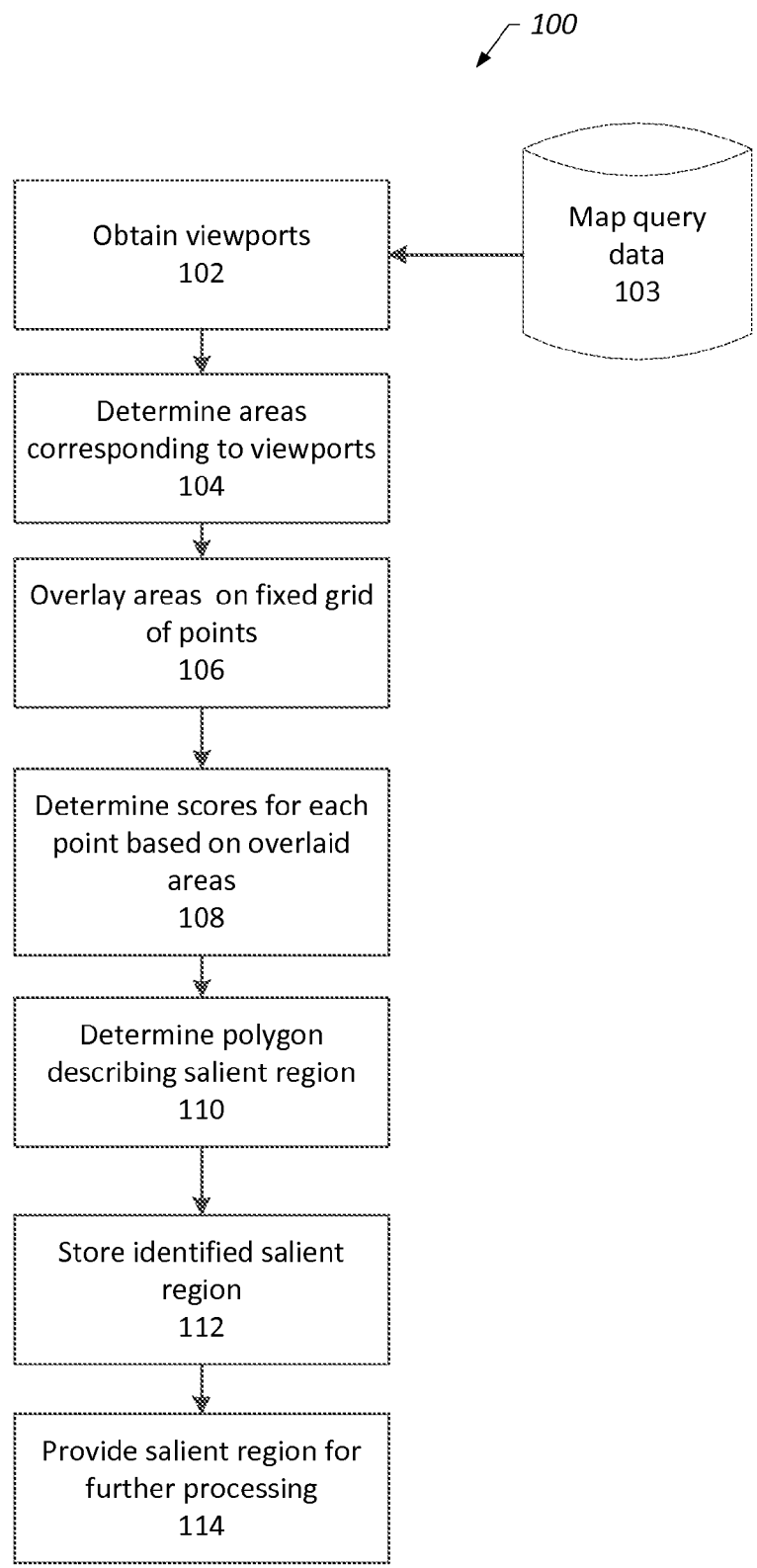
FIG. 1 is a block diagram of a process for determining salient regions of a geographic map in accordance with embodiments of the present invention.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION

As discussed in more detail below, provided in some embodiments are systems, methods, and computer-readable media for determining salient regions of a geographic map. The salient regions are determined from those portions of the geographic map that are viewed by users. Viewports generated for maps previously viewed by users are obtained. Areas defined by the map coordinates corresponding to the perimeter of the viewports are generated from the viewports. Next, the areas are overlaid on a fixed grid that has been overlaid on the geographic map. Each point on the fixed grid is assigned a score based on the number of viewport areas that overlay the point. A set of the grid points is selected based on the scores, and a region of the geographic map, e.g., a polygon enclosing the set of grid points, is determined.

FIG. 1 is a block diagram of a process 100 for determining salient regions of a geographic map in accordance with an embodiment of the present invention. Initially, viewports generated for geographic maps previously viewed by users are obtained (block 102). For example, the viewports can be obtained from map query data 103 that includes previously executed map search queries. Next, areas corresponding to the viewports are determined (block 104). The areas are defined by the map coordinates corresponding to the perimeter of the viewports, and, in some embodiments, may be rectangular. In some embodiments the map coordinates may be latitude and longitude coordinates. In other embodiments the areas may have different shapes and may be defined by other types of map coordinates.

Next, the viewport areas are overlaid on a fixed grid of points overlaid on the map of the geographic region (block 106). The grid points may be separated by a desired distance to obtain a desired density of grid points within the geographic region. Thus, the viewport areas may each encompass zero or more grid points of the fixed grid. Next, each grid point is assigned a score based on the number of viewport areas that overlay the point (block 108). Thus, a grid point that is overlaid by one area has a lower score than a grid point that is overlaid by three areas. Similarly, a grid point that is overlaid by six areas has a higher score than a grid point that is overlaid by four areas. In some embodiments, if a viewport area doesn't encompass a grid point, that area may be "snapped" to a nearest grid point based on proximity and weighted accordingly (i.e., counted as having a fractional overlay of the grid point, with the fraction increasing as the proximity decreases).

Next, a polygon enclosed by set of the grid points having scores above a threshold is determined (block 110). In some embodiments, the edges of the polygon are determined using an advancing front technique. For example, grid points having a score above a first threshold are selected and added to a set of regional seed points. A front is advanced from each seed point to neighboring grid points having scores that are above a second threshold that is lower than the first threshold. The process is continued until the front reaches grid points having scores that are below the second threshold. The area enclosed by the collection of grid points along the final front that can no longer be advanced defines a polygon. It should be appreciated that, in some embodiments the polygon may have one or more holes (i.e., a trim surface). For example, if a geographic region includes a portion having zero (or nearly zero) overlaid areas that are surrounded by overlaid areas, the polygon may be determined to surround, but not include, the portion having zero (or nearly zero) overlaid areas. Next, the polygon is identified as a salient region of the geographic map, and the salient region is stored (block 112). The salient region is then provided for further processing (block 114). For example, the salient region may be compared to cells or other divisions of geographic data to determine if features have changed. Advantageously, the salient region may also provide an easily reviewable area of a geographic map for operators, such as to enable review of data feeds and determine data feed errors. Moreover, in some embodiments the salient region is used to constrain the focus of automated tools that process aspects of the geographic region.

Figure 2A:
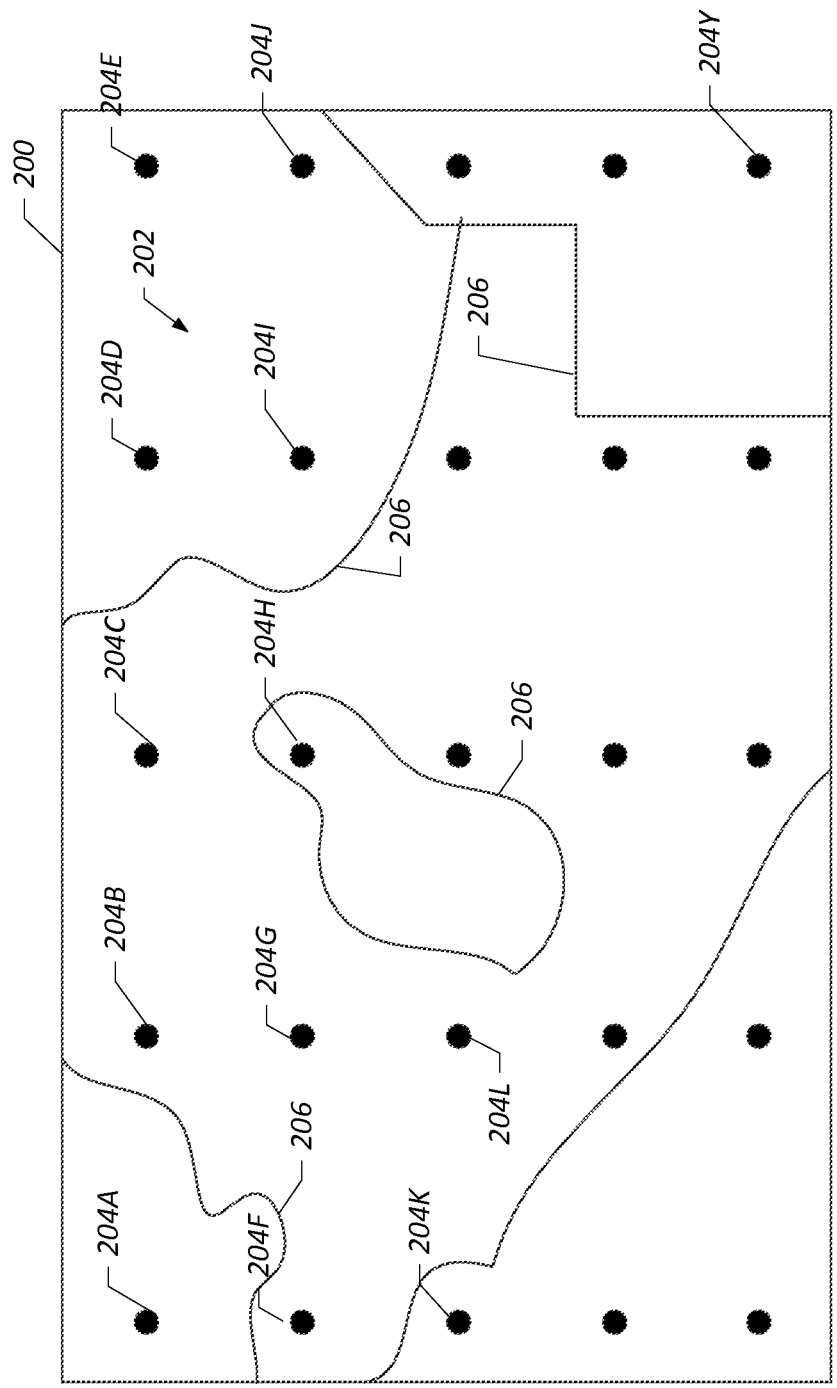
FIGS. 2A-2D are schematic diagrams illustrating a process for determining salient regions of a geographic map in accordance with an embodiment of the present invention.

FIGS. 2A-2D are schematic diagrams depicting an example process described above in FIG. 1 for determining salient regions of a geographic map and in accordance with an embodiment of the present invention. FIG. 2A depicts a portion 200 of a geographic map having a fixed grid 202 of points 204 in accordance with an embodiment of the present invention. The geographic map portion 200 may also include various features 206, such as geographic boundaries, points of interest, man-made structures, natural features, and the like. In some embodiments, features 206 may include neighborhoods, towns, cities, metropolitan areas, states, provinces, counties, parishes, or other settlements, communities, and the like. The points 204 are arranged in a fixed grid 202 such that each point is equidistant from the adjacent points. For example, point 204B is equidistant from points 204A, 204C, and 204G.

Figure 2B:
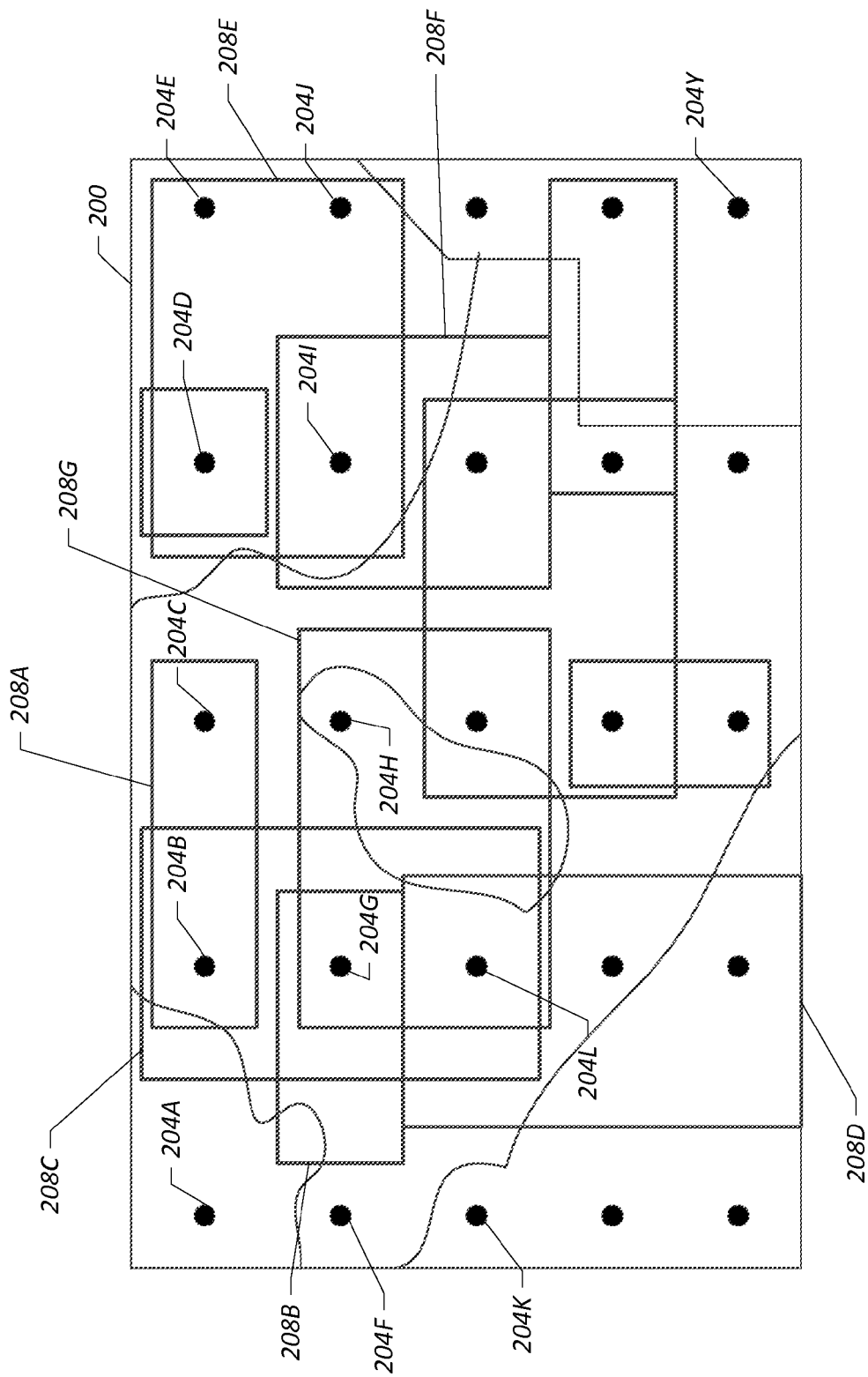

Next, as shown in FIG. 2B, viewport areas 208 are overlaid on the portion 200 of the geographic map and the fixed grid 202. As described above, the areas 208 are determined from the viewports of users who have previously viewed the geographic map. As shown in FIG. 2B, each area 208 overlays zero, one, or one or more points 204. For example, the area 208A overlays points 204B and 204C, the area 208B overlays point 204G, the area 208C overlays points 204B, 204G, and 204L, and so on. Thus, as also shown in FIG. 2B, some points of the fixed grid 202 are overlaid by multiple areas 208. For example, point 204B is overlaid by areas 208A and 208C, point 204I is overlaid by areas 208E and 208F, and so on. In contrast, point 204A is not overlaid by any areas 208. As mentioned, in some embodiments, if one of the overlaid areas 208 does not overlay a point, that area may be "snapped" to a point based on proximity the point.

Figure 2C:
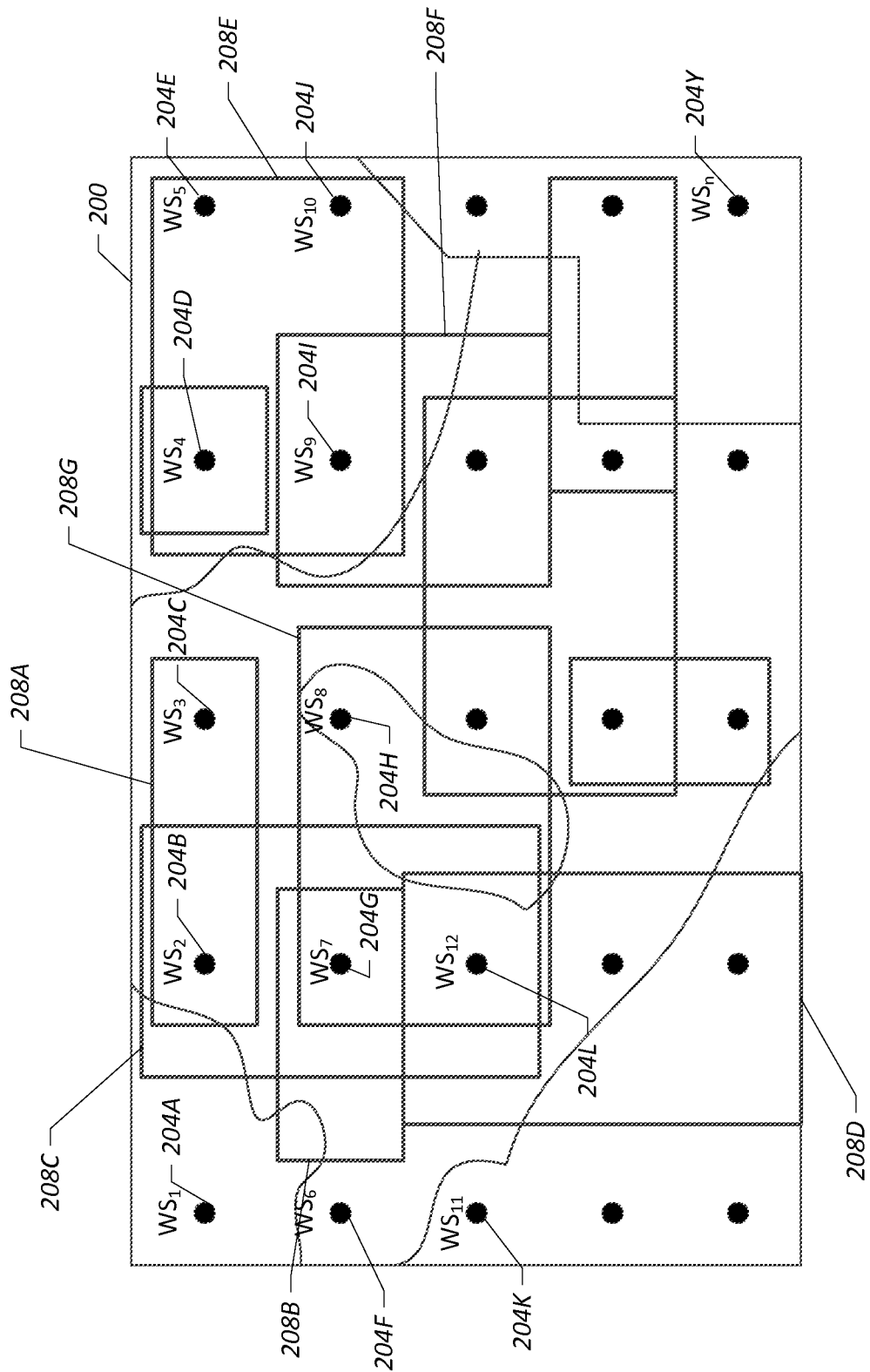

As described above in the process 100 depicted in FIG. 1, and as shown in FIG. 2C scores WS are assigned to each grid point based on the number of areas that overlay the grid point. For example, grid point 204A is assigned score $WS_1$, point 204B is assigned score WS2, point 204C is assigned score $WS_3$, and so on. As described above, grid points having a higher number of overlaid areas will have a higher score than grid points having a lower number of overlaid areas. For example, grid point 204B is overlaid by two areas 208A and 208C, while grid point 204A is not overlaid by any areas; thus, the score WS2 assigned to grid point 204B is higher than the score $WS_1$ assigned to grid point 204A. Similarly, based on the overlaid areas, the score $WS_7$ assigned to grid point 204G (3 overlaid areas) is higher than the score $WS_2$ assigned to point 204B (2 overlaid areas).

Figure 2D:
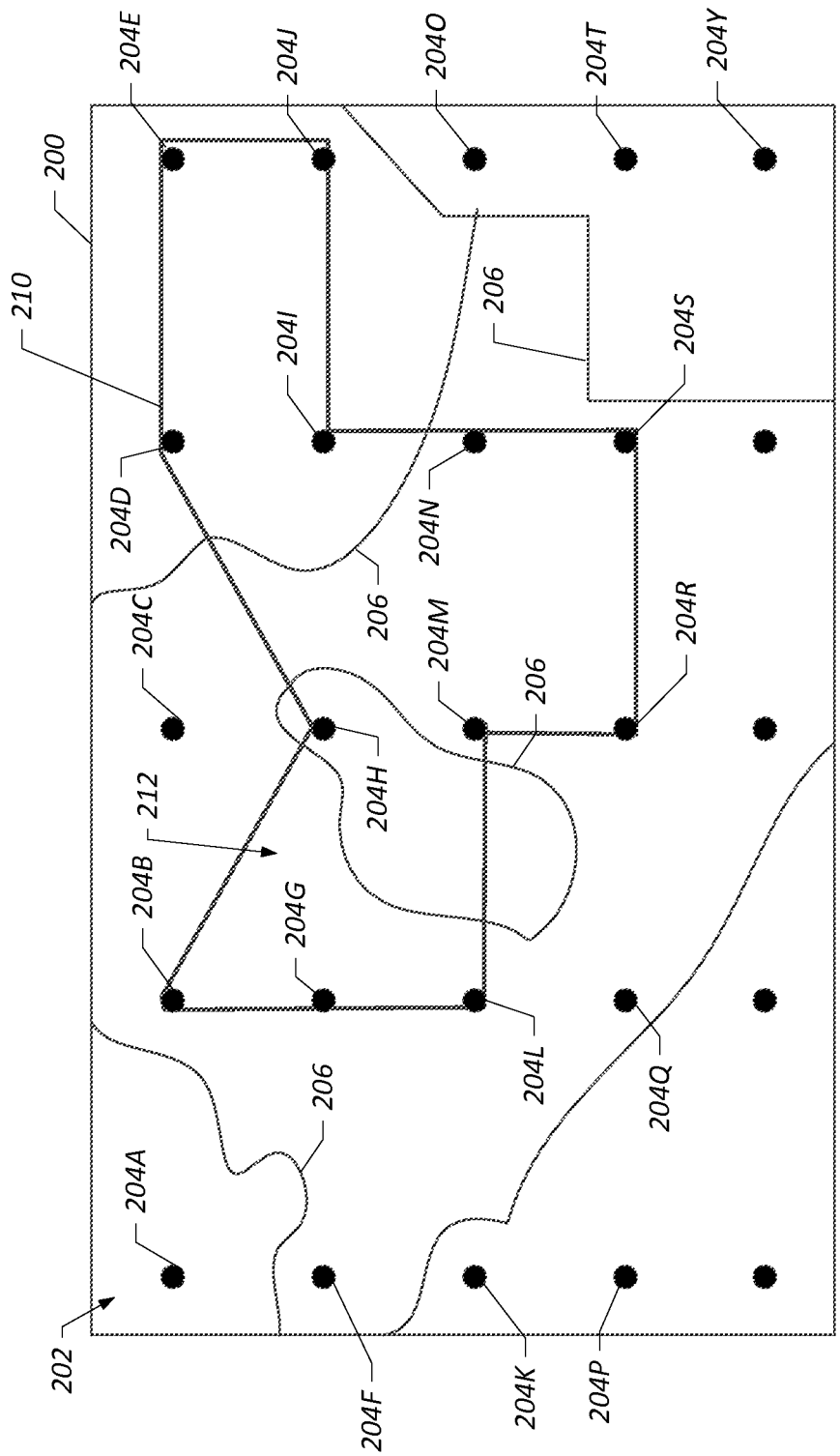

Next, as shown in FIG. 2D, a polygon 210 is generated that encompasses the connected grid points having the highest scores (i.e., scores above a first threshold). Thus, as shown in FIG. 2D, grid points 204B, 204D, 204E, 204G, 204H, 204I, 204J, 204L, 204M, 204N, 204R, and 204S are the connected grid points associated with the highest scores of the grid points 204 included in the portion 200. For example, an edge of the polygon 210 is generated between the points 204B and 204H, another edge is generated between the points 204H and 204D, another edge is generated between the points 204E and 204J, another edge is generated between the points 204J and 204I, and so on. Edges between connected points are determined until the polygon 210 is completed. As described above, the region 212 enclosed by the polygon 210 is identified as a salient region of the geographic map portion 200. In some instances, as shown in FIG. 2D, the salient region 212 may encompass one or more features 206 of the geographic map portion 200. For example, if a large number of user queries encompass a specific feature of the geographic map, then the areas generated from the viewports of such queries will likely encompass the points near the specific feature. As will be appreciated, the technique described above and illustrated in FIGS. 2A-2D may be performed for multiple portions of a geographic map, e.g., a geographic map of a state, province, country, continent, or the world, such that multiple salient regions are determined based on the viewports associated with previously executed user queries.

Figure 3:
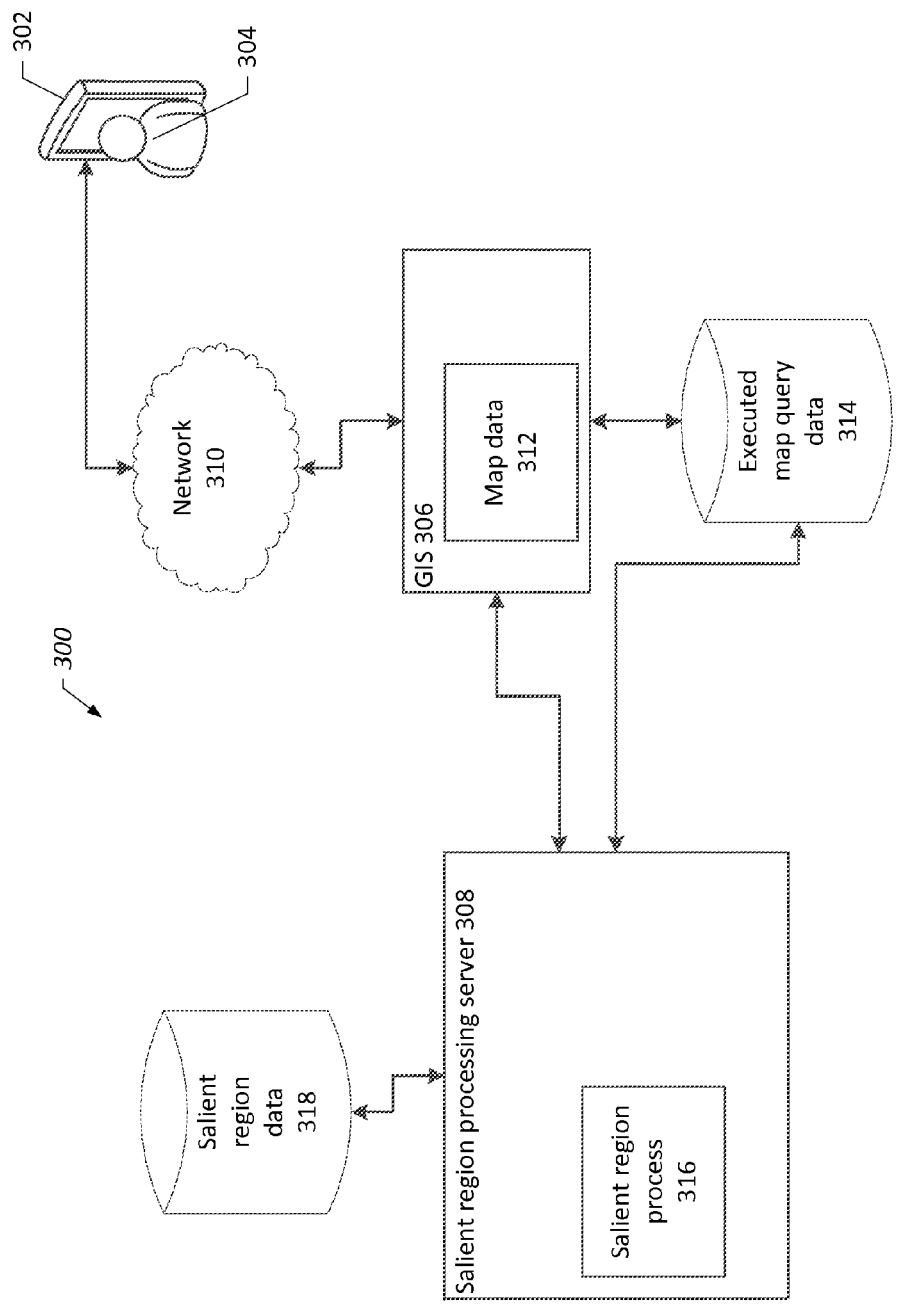
FIG. 3 is a schematic diagram of a system for determining salient regions of a geographic map.

FIG. 3 depicts a system 300 for determining salient regions of a geographic map in accordance with an embodiment of the present invention. The system 300 may include a client computer 302 associated with a user 304, a geographic information system 306, a salient region processing server 308, and a network 310. The client computer 302 may include desktop computer, laptop computers, tablet computers, smartphones, personal digital assistants, etc., and may include a receiver for a satellite-based positioning system, such as a Global Positioning System (GPS) receiver. The user 304 may use the client computer 302 to retrieve information, view interactive maps, and perform computer-implemented searches, such as by searching the World Wide Web using a web-based search engine or by searching an interactive map of a geographic area.

The salient region processing server 308 and the GIS 306 may each be a single server (in a discrete hardware component or as a virtual server) or multiple servers. The salient region processing server 308 and the GIS 306 may each include web servers, application servers, or other types of servers. Additionally, the salient region processing server 308 and the GIS 306 may each be, for example, computers arranged in any physical and virtual configuration, such as computers in one or more data processing centers, a distributed computing environment, or other configuration. Such configurations may use the network 310 for communication or may communicate over other networks.

The client computer 302 and GIS 306 are in communication with the network 310, such as through a wired or wireless network interface. In some embodiments, the network 310 may include multiple networks, and may include any suitable network and networking technology, such as the Internet, an intranet, a local area network (LAN), a wide area network (WAN), or any other suitable network. Additionally, the network 310 may include a wired network, a wireless network, or both. Moreover, it should be appreciated that the client computer 302 and GIS 306 may communicate over different networks separately and simultaneously. For example, the client computer 302 may communicate over both a wireless Ethernet network and a cellular network.

The GIS 306 includes map data 312 that may be used to provide geographic maps, such as interactive geographic maps, to the user 304 via the client computer 302. For example, in some embodiments, the GIS 306 may include or provide the map data 312 to a web application, a native application, or other application accessed by the client computer 302. The user 304 may use such an application to view and interact with geographic maps generated from the map data 312. In some embodiment, as described above, the user 304 executes map queries to search the geographic map. Map data responsive to the user's map queries is provided to the client computer 302. Queries executed by the user 304 (and executed by other users) are stored a map query data 314. The map query data 314 may be a part of the GIS 306 or separate from but accessible by the map query data 314. For example, the map query data 314 may be stored in a database or other data structure and stored on a server.

The salient region processing server 308 includes a salient region process 316 that determined a salient region from the map query data 314. For example, the salient region process 316 may obtain previously executed map queries from the executed map queries 314 and the map 312 and execute the steps described above to determine salient regions for portions of a geographic map based on the map 312. The determined salient regions are stored as salient region data 318 and may be provided to various other processes and systems.

Figure 4:
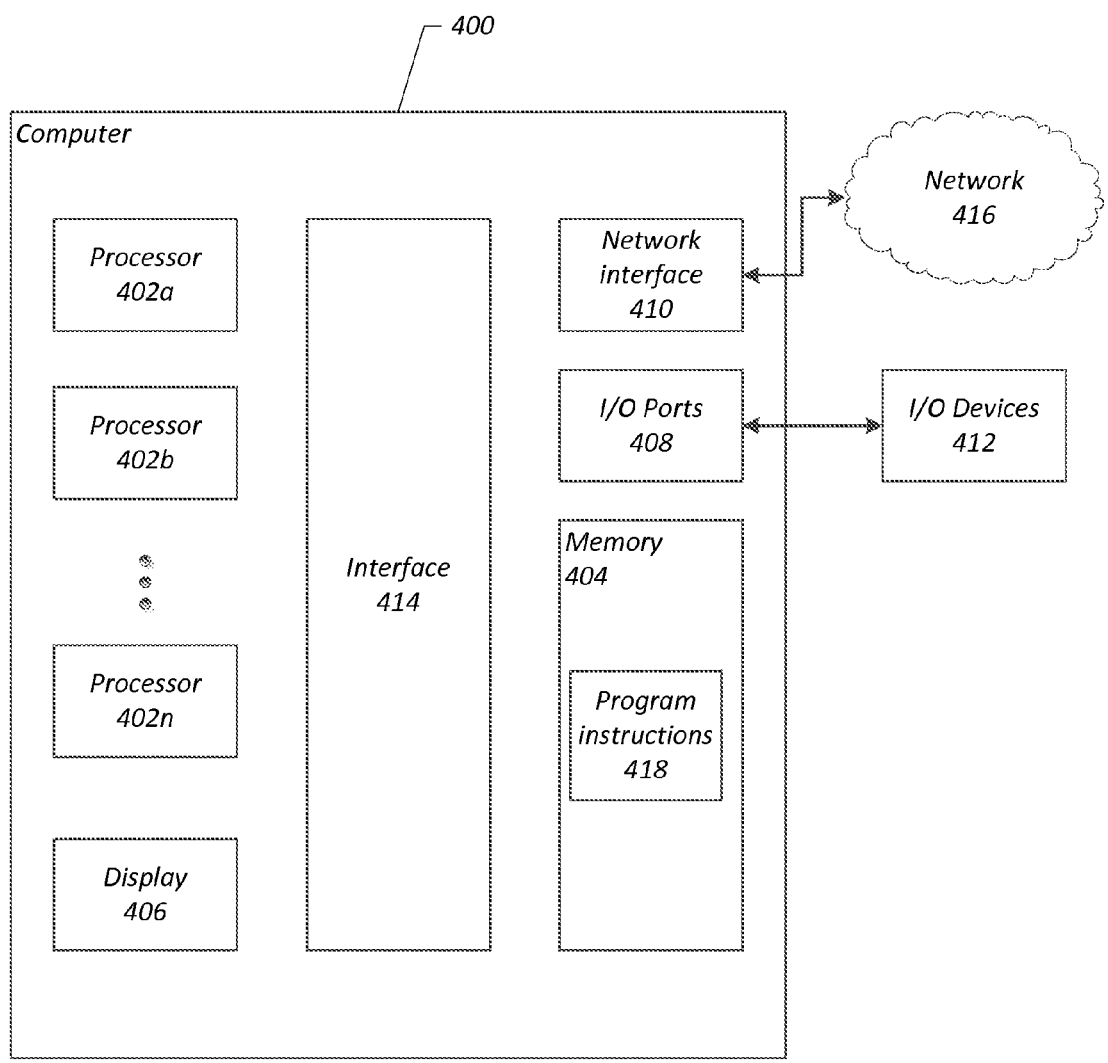
FIG. 4 is a block diagram of a computer in accordance with an embodiment of the present invention.

FIG. 4 depicts a computer 400 (e.g., a client computer, a server, etc.) in accordance with an embodiment of the present invention. Various portions or sections of systems and methods described herein include or are executed on one or more computers similar to computer 400 and programmed as special-purpose machines executing some or all steps of methods described above as executable computer code. Further, processes and modules described herein may be executed by one or more processing systems similar to that of computer 400.

The computer 400 may include various internal and external components that contribute to the function of the device and which may allow the computer 400 to function in accordance with the techniques discussed herein. As will be appreciated, various components of computer 400 may be provided as internal or integral components of the computer 400 or may be provided as external or connectable components. It should further be noted that FIG. 4 depicts merely one example of a particular implementation and is intended to illustrate the types of components and functionalities that may be present in computer 400. As shown in FIG. 4, the computer 400 may include one or more processors (e.g., processors 402a-402n) coupled to a memory 404, a display 406, I/O ports 408 and a network interface 410, via an interface 414.

Computer 400 may include any combination of devices or software that may perform or otherwise provide for the performance of the techniques described herein. For example, computer 400 may include or be a combination of a cloud-computing system, a data center, a server rack or other server enclosure, a server, a virtual server, a desktop computer, a laptop computer, a tablet computer, a mobile telephone, a personal digital assistant (PDA), a media player, a game console, a vehicle-mounted computer, or the like. The computer 400 may be a unified device providing any one of or a combination of the functionality of a media player, a cellular phone, a personal data organizer, a game console, and so forth. Computer 400 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

In addition, the computer 400 may allow a user to connect to and communicate through a network 416 (e.g., the Internet, a local area network, a wide area network, etc.) and to acquire data from a satellite-based positioning system (e.g., GPS). For example, the computer 400 may allow a user to communicate using e-mail, text messaging, instant messaging, or using other forms of electronic communication, and may allow a user to obtain the location of the device from the satellite-based positioning system, such as the location on an interactive map.

In one embodiment, the display 406 may include a liquid crystal display (LCD) or an organic light emitting diode (OLED) display, although other display technologies may be used in other embodiments. The display 406 may display a user interface (e.g., a graphical user interface). In accordance with some embodiments, the display 406 may include or be provided in conjunction with touch sensitive elements through which a user may interact with the user interface. Such a touch-sensitive display may be referred to as a "touch screen" and may also be known as or called a touch-sensitive display system.

The processor 402 may provide the processing capability required to execute the operating system, programs, user interface, and any functions of the computer 400. The processor 402 may receive instructions and data from a memory (e.g., system memory 404). The processor 402 may include one or more processors, such as "general-purpose" microprocessors, and special purpose microprocessors, such as ASICs. For example, the processor 402 may include one or more reduced instruction set (RISC) processors, such as those implementing the Advanced RISC Machine (ARM) instruction set. Additionally, the processor 402 may include single-core processors and multicore processors and may include graphics processors, video processors, and related chip sets. Accordingly, computer 400 may be a uni-processor system including one processor (e.g., processor 402a), or a multi-processor system including any number of suitable processors (e.g., 402a-402n). Multiple processors may be employed to provide for parallel or sequential execution of one or more sections of the techniques described herein. Processes, such as logic flows, described herein may be performed by one or more programmable processors executing one or more computer programs to perform functions by operating on input data and generating corresponding output.

The memory 404 (which may include one or more tangible non-transitory computer readable storage medium) may include volatile memory, such as random access memory (RAM), and non-volatile memory, such as ROM, flash memory, a hard drive, any other suitable optical, magnetic, or solid-state storage medium, or a combination thereof. The memory 404 may be accessible by the processor 402 and other components of the computer 400. The memory 404 may store a variety of information and may be used for a variety of purposes. The memory 404 may store executable computer code, such as the firmware for the computer 400, an operating system for the computer 400, and any other programs or other executable code necessary for the computer 400 to function. The executable computer code may include program instructions 418 executable by a processor (e.g., one or more of processors 402a-402n) to implement one or more embodiments of the present invention. For example, the process 300 described above may be implemented in program instructions 418. Instructions 418 may include modules of computer program instructions for implementing one or more techniques described herein with regard to various processing modules. Program instructions 418 may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, a subroutine. A computer program may or may not correspond to a file in a file system. A program may be stored in a section of a file that holds other programs or data (e.g., one or more scripts stored in a markup language document), in a single file dedicated to the program in question, or in multiple coordinated files (e.g., files that store one or more modules, sub programs, or sections of code). A computer program may be deployed to be executed on one or more computer processors located locally at one site or distributed across multiple remote sites and interconnected by a communication network. In addition, the memory 404 may be used for buffering or caching during operation of the computer 400. The memory 404 may also store data files such as media (e.g., music and video files), software (e.g., for implementing functions on computer 400), preference information (e.g., media playback preferences), wireless connection information (e.g., information that may enable media device to establish a wireless connection), telephone information (e.g., telephone numbers), and any other suitable data.

As mentioned above, the memory 404 may include volatile memory, such as random access memory (RAM). The memory 404 may also include non-volatile memory, such as ROM, flash memory, a hard drive, any other suitable optical, magnetic, or solid-state storage medium, or a combination thereof. The interface 414 may include multiple interfaces and may couple various components of the computer 400 to the processor 402 and memory 404. In some embodiments, the interface 414, the processor 402, memory 404, and one or more other components of the computer 400 may be implemented on a single chip, such as a system-on-a-chip (SOC). In other embodiments, these components, their functionalities, or both may be implemented on separate chips. The interface 414 may be configured to coordinate I/O traffic between processors 402a-402n, system memory 404, network interface 410, I/O devices 412, other peripheral devices, or a combination thereof. The interface 414 may perform protocol, timing or other data transformations to convert data signals from one component (e.g., system memory 404) into a format suitable for use by another component (e.g., processors 402a-402n). The interface 414 may include support for devices attached through various types of peripheral buses, such as a variant of the Peripheral Component Interconnect (PCI) bus standard or the Universal Serial Bus (USB) standard.

The computer 400 may also include an input and output port 408 to allow connection of additional devices, such as I/O devices 412. Embodiments of the present invention may include any number of input and output ports 408, including headphone and headset jacks, universal serial bus (USB) ports, Firewire or IEEE-1394 ports, and AC and DC power connectors. Further, the computer 400 may use the input and output ports to connect to and send or receive data with any other device, such as other portable computers, personal computers, printers, etc.

The computer 400 depicted in FIG. 4 also includes a network interface 410, such as a wired network interface card (NIC), wireless (e.g., radio frequency) receivers, etc.

For example, the network interface 410 may receive and send electromagnetic signals and communicate with communications networks and other communications devices via the electromagnetic signals. The network interface 410 may include known circuitry for performing these functions, including an antenna system, an RF transceiver, one or more amplifiers, a tuner, one or more oscillators, a digital signal processor, a CODEC chipset, a subscriber identity module (SIM) card, memory, and so forth. The network interface 410 may communicate with networks (e.g., network 416), such as the Internet, an intranet, a cellular telephone network, a wireless local area network (LAN), a metropolitan area network (MAN), or other devices by wireless communication. The communication may use any suitable communications standard, protocol and technology, including Ethernet, Global System for Mobile Communications (GSM), Enhanced Data GSM Environment (EDGE), a 3G network (e.g., based upon the IMT-2000 standard), high-speed downlink packet access (HSDPA), wideband code division multiple access (W-CDMA), code division multiple access (CDMA), time division multiple access (TDMA), a 4G network (e.g., IMT Advanced, Long-Term Evolution Advanced (LTE Advanced), etc.), Bluetooth, Wireless Fidelity (Wi-Fi) (e.g., IEEE 802.11a, IEEE 802.11b, IEEE 802.11g or IEEE 802.11n), voice over Internet Protocol (VoIP), Wi-MAX, a protocol for email (e.g., Internet message access protocol (IMAP) or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), Multimedia Messaging Service (MMS), Short Message Service (SMS), or any other suitable communication protocol.

Various embodiments may further include receiving, sending or storing instructions and/or data implemented in accordance with the foregoing description upon a computer-accessible medium. Generally speaking, a computer-accessible/readable storage medium may include a non-transitory storage media such as magnetic or optical media, (e.g., disk or DVD/CD-ROM), volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description. As used throughout this application, the word "may" is used in a permissive sense (i.e., meaning having the potential to), rather than the mandatory sense (i.e., meaning must). The words "include", "including", and "includes" mean including, but not limited to. As used throughout this application, the singular forms "a", "an" and "the" include plural referents unless the content clearly indicates otherwise. Thus, for example, reference to "an element" includes a combination of two or more elements. Unless specifically stated otherwise, as apparent from the discussion, it is appreciated that throughout this specification discussions utilizing terms such as "processing", "computing", "calculating", "determining" or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical electronic or magnetic quantities within memories, registers, or other information storage devices, transmission devices, or display devices of the special purpose computer or similar special purpose electronic processing/computing device.

What is claimed is:

1. A computer-implemented method for determining a salient region of a geographic map, the method comprising:
    obtaining, by one or more processors, a plurality of viewports associated with a geographic map, the plurality of viewports having been previously used by a plurality of users to view at least some of a portion of the geographic map;
    determining, by one or more processors and using map coordinates corresponding to perimeters of the plurality of viewports, a plurality of geographic areas corresponding to the plurality of viewports;
    overlaying, by one or more processors, a plurality of grid points arranged in a fixed grid on the portion of the geographic map;
    overlaying, by one or more processors, the plurality of geographic areas corresponding to the plurality of viewports on the portion of the geographic map;
    determining, by one or more processors and for each of the plurality of grid points, a score based at least in part on how many of the plurality of geographic areas overlay the grid point;
    generating, by one or more processors, data indicative of a salient region of the geographic map, at least in part by
        determining, based on the determined scores for the plurality of grid points, a polygon defined by a subset of the plurality of grid points, and
        identifying, the polygon as defining the salient region of the geographic map; and
    storing the generated data indicative of the salient region in a memory for further processing.

2. The computer-implemented method of claim 1, comprising:
    determining that a first one of the plurality of geographic areas does not overlay any of the plurality of grid points; and
    identifying a nearest grid point from among the plurality of grid points, and a distance between the nearest grid point and the first one of the geographic areas,
    wherein determining the score for the nearest grid point is further based on the distance between the nearest grid point and the first geographic area.

3. The computer-implemented method of claim 1, wherein determining the polygon defined by the subset of the plurality of grid points based on the determined scores for the plurality of grid points comprises determining a connected set of grid points each having a score above a threshold by an advancing front determination.

4. The computer-implemented method of claim 1, wherein determining the polygon defined by the subset of the plurality of grid points based on the determined scores for the plurality of grid points comprises:
identifying a first subset of the plurality of grid points having a score that is higher than a first threshold, the first subset defining the seeds of an advancing front;
iteratively identifying a second subset of the plurality of grid points having a score that is higher than a second threshold and that surround the grid points in the first subset, the second threshold being lower than the first threshold; and
connecting the plurality of grid points in the second subset to determine the polygon.

5. The computer-implemented method of claim 1, wherein the plurality of geographic areas comprises a plurality of rectangles.

6. The computer-implemented method of claim 1, further comprising:
comparing, by one or more processors, a feature of the geographic map to the salient region; and
determining, by one or more processors, whether the feature has changed based on the comparison.

7. A system for determining a salient region of a geographic map, the system comprising:
one or more processors; and
a non-transitory memory storing computer code, the computer code comprising a set of instructions that, when executed by the one or more processors, causes the one or more processors to:
obtain a plurality of viewports associated with a geographic map, the plurality of viewports having been previously used by a plurality of users to view at least some of a portion of the geographic map,
determine, using map coordinates corresponding to perimeters of the plurality of viewports, a plurality of geographic areas corresponding to the plurality of viewports,
overlay a plurality of grid points arranged in a fixed grid on the portion of the geographic map,
overlay the plurality of geographic areas corresponding to the plurality of viewports on the portion of the geographic map,
determine, for each of the plurality of grid points, a score based at least in part on how many of the plurality of geographic areas overlay the grid point,
generate data indicative of a salient region of the geographic map, at least in part by
determining, based on the determined scores for the plurality of grid points, a polygon defined by a subset of the plurality of grid points, and
identifying the polygon as defining a salient region of the geographic map, and
store the generated data indicative of the salient region in a memory for further processing.

8. The system of claim 7, wherein the set of instructions causes the one or more processors to:
determine that a first one of the plurality of geographic areas does not overlay any of the plurality of grid points; and
identify a nearest grid point from among the plurality of grid points, and a distance between the nearest grid point and the first one of the geographic areas,
wherein the score for the nearest grid point is further based on the distance between the nearest grid point and the first geographic area.

9. The system of claim 7, wherein the set of instructions causes the one or more processors to determine the polygon defined by the subset of the plurality of grid points based on the determined scores for the plurality of grid points at least in part by determining a connected set of grid points each having a score above a threshold by an advancing front determination.

10. The system of claim 7, wherein the set of instructions causes the one or more processors to determine the polygon defined by the subset of the plurality of grid points based on the determined scores for the plurality of grid points at least in part by:
identifying a first subset of the plurality of grid points having a score that is higher than a first threshold, the first subset defining the seeds of an advancing front;
iteratively identifying a second subset of the plurality of grid points having a score that is higher than a second threshold and that surround the grid points in the first subset, the second threshold being lower than the first threshold; and
connecting the plurality of grid points in the second subset to determine the polygon.

11. The system of claim 7, wherein the plurality of geographic areas comprises a plurality of rectangles.

12. The system of claim 7, wherein the set of instructions further causes the one or more processors to:
compare a feature of the geographic map to the salient region; and
determine whether the feature has changed based on the comparison.

13. A non-transitory computer-readable storage medium storing computer code, the computer code comprising a set of instructions that, when executed by one or more processors, causes the one or more processors to:
obtain a plurality of viewports associated with a geographic map, the plurality of viewports having been previously used by a plurality of users to view at least some of a portion of the geographic map;
determine, using map coordinates corresponding to perimeters of the plurality of viewports, a plurality of geographic areas corresponding to the plurality of viewports;
overlay a plurality of grid points arranged in a fixed grid on the portion of the geographic map;
overlay the plurality of geographic areas corresponding to the plurality of viewports on the portion of the geographic map;
determine, for each of the plurality of grid points, a score based at least in part on how many of the plurality of geographic areas overlay the grid point;
generate data indicative of a salient region of the geographic map, at least in part by
determining, based on the determined scores for the plurality of grid points, a polygon defined by a subset of the plurality of grid points, and
identifying the polygon as defining a salient region of the geographic map; and
store the generated data indicative of the salient region in a memory for further processing.

14. The non-transitory computer-readable storage medium of claim 13, wherein the set of instructions causes the one or more processors to:

determine that a first one of the plurality of geographic areas does not overlay any of the plurality of grid points; and identify a nearest grid point from among the plurality of grid points, and a distance between the nearest grid point and the first one of the geographic areas, wherein the score for the nearest grid point is further based on the distance between the nearest grid point and the first geographic area.

15. The non-transitory computer-readable storage medium of claim 13, wherein the set of instructions causes the one or more processors to determine the polygon defined by the subset of the plurality of grid points based on the determined scores for the plurality of grid points at least in part by determining a connected set of grid points each having a score above a threshold by an advancing front determination.

16. The non-transitory computer-readable storage medium of claim 13, wherein the set of instructions causes the one or more processors to determine the polygon defined by the subset of the plurality of grid points based on the determined scores for the plurality of grid points at least in part by:

identifying a first subset of the plurality of grid points having a score that is higher than a first threshold, the first subset defining the seeds of an advancing front;

iteratively identifying a second subset of the plurality of grid points having a score that is higher than a second threshold and that surround the grid points in the first subset, the second threshold being lower than the first threshold; and connecting the plurality of grid points in the second subset to determine the polygon.

17. The non-transitory computer-readable storage medium of claim 13, wherein the set of instructions further causes the one or more processors to:

compare a feature of the geographic map to the salient region; and determine whether the feature has changed based on the comparison.

\* \* \* \* \*